April 3, 1962

H. L. PHARES 3,027,702

STALK SHREDDER

Filed Aug. 1, 1958

INVENTOR.
HOWARD L. PHARES

BY C. W. Coffee
Atty.

April 3, 1962   H. L. PHARES   3,027,702
STALK SHREDDER
Filed Aug. 1, 1958   2 Sheets-Sheet 2
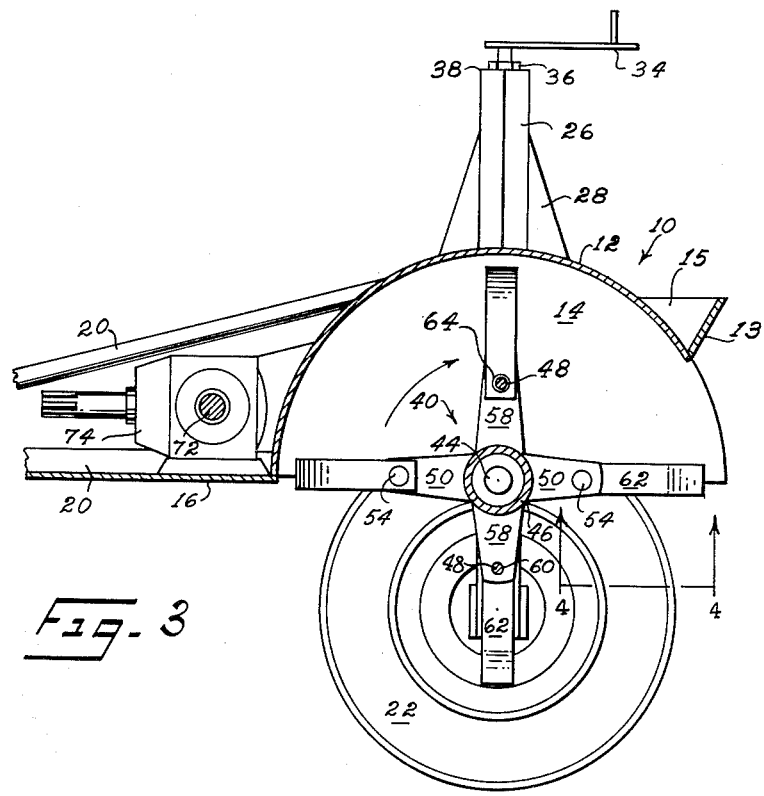
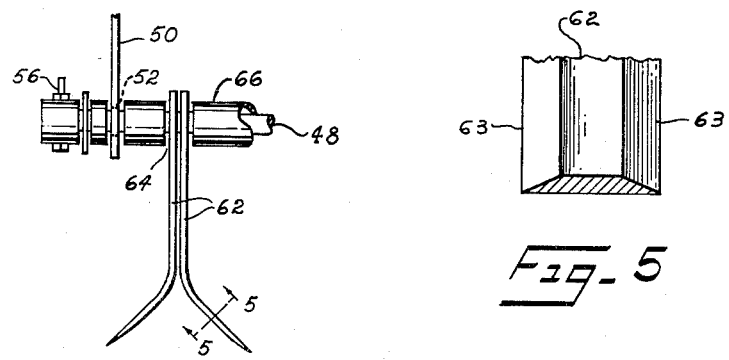
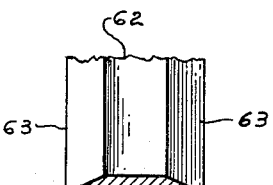
HOWARD L. PHARES
INVENTOR.
BY
ATTY.

United States Patent Office 3,027,702
Patented Apr. 3, 1962

3,027,702
STALK SHREDDER
Howard L. Phares, Lubbock, Tex., assignor to Phares & Wilkins Mfg. Co., Lubbock, Tex., a copartnership
Filed Aug. 1, 1958, Ser. No. 752,448
6 Claims. (Cl. 56—26)

This invention pertains to agricultural implements for shredding stalks of various plants.

This application is a continuation-in-part of my prior application for Stalk Shredder, filed September 4, 1956, Serial No. 607,702, now abandoned.

In farming there is often a need to destroy the standing stalks of various plants. This need is particularly acute in the production of grain sorghums; right after the grain is harvested a large, pulpy stalk is left standing. Also, in the particular area of west Texas and eastern New Mexico certain native plant growths are found which are difficult to destroy otherwise; these include sage, mesquite, and shinnery. The stalk shredder of this invention is designed to destroy or shred these stalks as well as stalks of any other plants in agricultural operations.

An object of this invention is to provide a shredder which will destroy the standing stalks of various plants.

Another object is to provide such a shredder which requires a minimum of power to operate.

Other objects are to achieve the above with a machine that is sturdy, simple, and reliable; yet inexpensive and easy to manufacture.

The specific nature of the invention as well as other objects, uses, and advantages thereof will clearly appear from the following description and from the accompanying drawings in which:

FIG. 3 is an enlarged inverted cross sectional view taken on line 3—3 of FIG. 2.

FIG. 4 is an enlarged detail of the flails of the shredder.

FIG. 5 is an enlarged sectional view taken on line 5—5 of FIG. 4.

Figure 1:
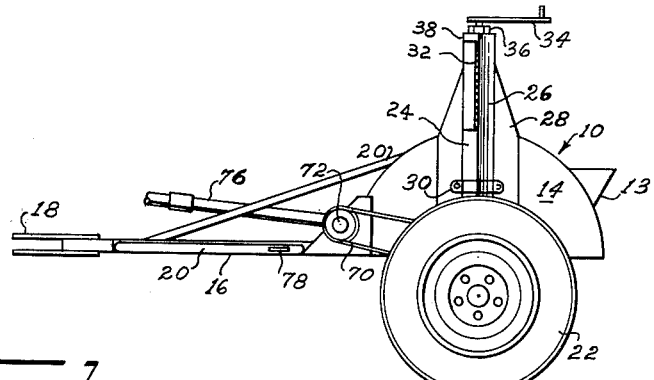
FIG. 1 is a side elevation of a shredder according to this invention.
Figure 2:
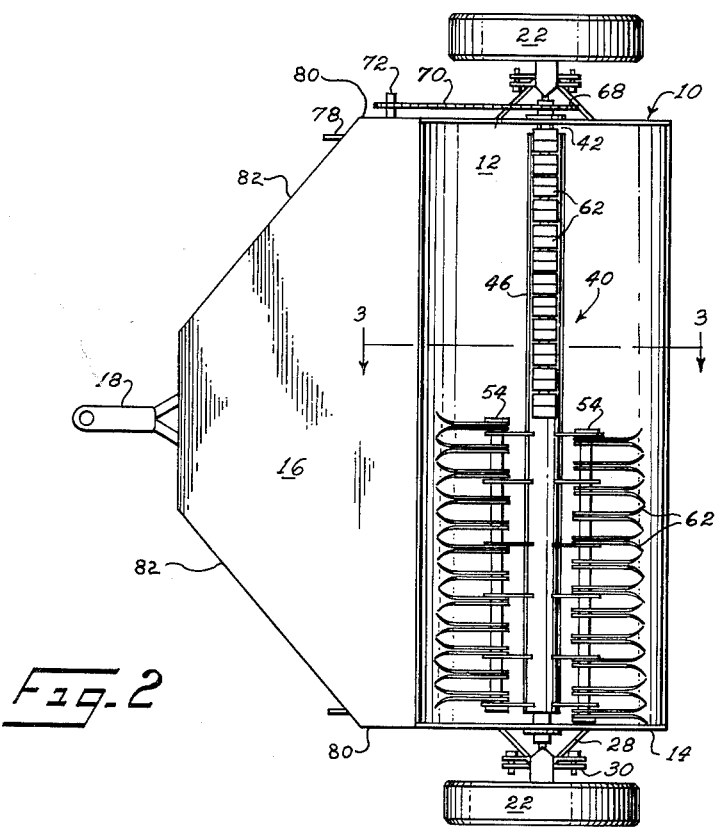
FIG. 2 is a bottom view of the shredder.

As seen in the accompanying drawings, one embodiment of the device according to this invention has a unitary frame and cover 10. This includes segment of a cylinder 12. Either end of the segment is closed by metal end plates 14 which are of general circular form with a segment removed. On the after side of the cylinder is a radial brace 13. Gussets 15 extend parallel to end plates 14 to provide a rigid structure. The cylindrical segment terminates at this after brace. Forward of the cylindrical segment and extending from its lower edge is apron 16. On the forward end of the apron is tongue or hitch 18 by which the shredder may be attached to a tractor (not shown) for drawing it through the field. Extending back from the hitch are various braces 20 to cause the frame to be a sturdy structure. The purpose of the apron is twofold. First, it braces the tongue and, second, it protects the operator and the tractor itself from flying objects kicked up by the moving parts of the shredder.

The frame is supported by two ground engaging wheels or pneumatic tires 22. These tires are mounted to rotate about spindles (not shown) which are attached to square stanchions 24. The square stanchions are mounted to reciprocate axially within square sleeve 26. The square sleeve is attached to the circular end plates 14 by gussets 28. Each stanchion is normally held rigid to its sleeve by clamp 30. However, when the clamp is loosened, the stanchion may be adjusted by means of screw 32 which is operated by crank arm 34. The screw is threaded into the top of the stanchion so that upon rotation it will cause the stanchion to move up or down relative to the screw. The screw itself is held against axial movement by collars 36 on either side of yoke 38 which is attached to the top of the sleeve. Thus the wheels are mounted for adjustment as to height relative to the frame.

Coaxially with the cylindrical portion of the frame is horizontal reel 40. The reel is supported at either end by bearings 42. These bearings are securely attached to the frame. Journalled within the bearings are stub shafts 44. These stub shafts are attached within cylindrical reel axial shaft of tubular form 46. The cylindrical tubular shaft itself is the primary support element for the reel. It is coaxial with the reel and the frame. The reel tubular shaft has two sets of bolts attached to it. On one end, the tubular shaft 46 has flail bolts 48 which are diametrically opposed. These bolts 48 pass through ears 50 which are welded to the tubular shaft 46 diametrically opposed; the bolts 48 pass through holes 52 in the ears. On one end of the shaft there is a welded abutment 54 while the other end of the shaft has pin 56 therethrough. On the other end of the reel tubular shaft there are additional ears 58 welded to the tubular shaft with apertures 60. Otherwise stated there are four bolts 48, two of which extend through ears 50 and two of which extend through ears 58. However, on this end of the tubular shaft the ears are rotated 90 degrees from the ears 50. Therefore, as the reel tubular shaft rotates, first a shaft extending from about the center of tubular shaft 46 to about the right end of the tubular shaft will be on the lower position. Then 90 degrees' rotation later a shaft extending from about the center to about the left end of the tube will be in the lower position; and another 90 degrees, a shaft again on the right side; etc.

A plurality of flails 62 are pivoted to each shaft. Each flail consists of a strip of metal with hole 64 through one end. The other end of the strip is bent at about 45 degrees. The strip of metal is bevelled on both edges 63 along that side which is on the concave side of the bend. The flails are assembled on the shaft in pairs. They are placed back to back, i.e. with the bevelled sides oriented outward and so that together they form a Y-shaped figure. There are spacer tubes 66 around the shaft between each pair. Along the outer side of one shaft the flails are placed against one ear. However, on the other shaft a spacer half the width of the normal spacers is placed. Therefore, the flails on one shaft are spaced halfway between the flails on the shaft diametrically opposed. This gives a solid cut on the vegetation when the reel as a whole is rotating.

One stub shaft 44 extends through the circular end plate 14 and has a sprocket 68 attached on the outer end thereof. This sprocket is driven by a chain 70 which in turn is driven by a sprocket carried on jack shaft 72. The jack shaft is driven by a right-angle gear box 74. The input to the gear box is through a shaft and universal joint and splined expander 76. Not shown is a coupling adapted to attach to the power takeoff (not shown) of the tractor which is adapted to pull the device. The gear box is such that the reel rotates in the direction or sense shown by arrow R, i.e. the flail in its lowest position will move forward or in the same direction of travel as the shredder as a whole which is normal to the axis of the reel and indicated by the arrow A. When a flail is forward of the axis of the reel, it is moving upward. I have found that the direction of rotation is important.

Prongs 78 extend forward at the apron 16 along the outboard edge 80. These prongs are aligned with the outer edge of reel 40 and prevent the angled edge 82 of the apron from guiding some of the vegetation away from the flails.

It will be apparent that the embodiment shown is only exemplary and that various modifications can be made in construction, materials, and arrangement within the scope of the invention as defined in the appended claims.

I claim as my invention:

1. In an agricultural stalk shredder having a frame, a horizontal reel mounted for rotation in said frame, means attached to the frame for rotating the reel, means on the frame for suspending the frame at an adjustable height above the ground and means on the frame for moving the frame normal to the axis of the reel; the improved reel consisting of: an axial shaft extending along the axis of the reel; a plurality of ears attached to the axial shaft; two flail bolts connected to said ears, said flail bolts parallel to said axial shaft, said flail bolts terminating at about the longitudinal center of the axial shaft and extending to about one end of the axial shaft, said flail bolts diametrically opposed; additional ears attached to the axial shaft; two additional flail bolts connected to said additional ears, said additional flail bolts parallel to said axial shaft, said additional flail bolts terminating at about the longitudinal center of the axial shaft and extending to about the other end of the axial shaft, said additional flail bolts in a plane normal to a plane containing said first flail bolts; and shredding flails pivoted about each of the four flail bolts.

2. The invention as defined in claim 1 wherein said means for rotating said reel is means for rotating it in a direction so that when any flail is in the lowest position it moves forward with reference to the direction of travel.

3. The invention as defined in claim 1 wherein each of said flails is a strip of metal with a hole in one end, one of said bolts passing through said hole, the other end of said flail being bent about an axis normal to the axis of said hole.

4. The invention as defined in claim 3 wherein each flail is bevelled on both edges along that side which is on the concave side of the bend.

5. The invention as defined in claim 3 wherein said flails are assembled on said bolts in pairs, each pair consisting of two flails back to back with the bevelled sides oriented outward, so that the pair form a Y-shaped figure.

6. A stalk shredder comprising: a frame adapted to be drawn in a certain direction by a tractor, a horizontal shaft mounted for rotation about its axis on said frame, the axis of said shaft being normal to the direction which it would be drawn by the tractor, a plurality of pivot bolts mounted on the shaft parallel to the axis of the shaft, a plurality of flails connected to the pivot bolts, all the flails and bolts on one-half of the shaft lying in a diametrical plane, all the flails and bolts on the other half of the shaft lying in a diametrical plane, which is rotated 90 degrees with respect to the first mentioned diametrical plane, said flails mounted for pivoting about said pivot bolts, said flails having a bevelled edge which faces forward when the flail is below the shaft, and means attached to the frame for rotating the shaft so that when the flail is in its lower position it travels at a higher velocity and in the same direction as the frame.

References Cited in the file of this patent

UNITED STATES PATENTS

| | | |
|---|---|---|
| 1,542,963 | Russell | June 23, 1925 |
| 1,698,724 | Johnston et al. | Jan. 15, 1929 |
| 2,500,914 | Sells et al. | Mar. 14, 1950 |
| 2,505,089 | Bailey et al. | Apr. 25, 1950 |
| 2,520,229 | Trauger | Aug. 15, 1950 |
| 2,711,067 | Mott | June 21, 1955 |